Aug. 28, 1962 — O. L. BUNN — 3,051,501

STEERING APPARATUS FOR CHILD'S VEHICLE

Original Filed Sept. 2, 1958 — 2 Sheets-Sheet 1

Inventor:
Opal L. Bunn
By: Schroeder, Hofgren,
Brady & Wegner
Attorneys

Aug. 28, 1962    O. L. BUNN    3,051,501
STEERING APPARATUS FOR CHILD'S VEHICLE
Original Filed Sept. 2, 1958    2 Sheets-Sheet 2
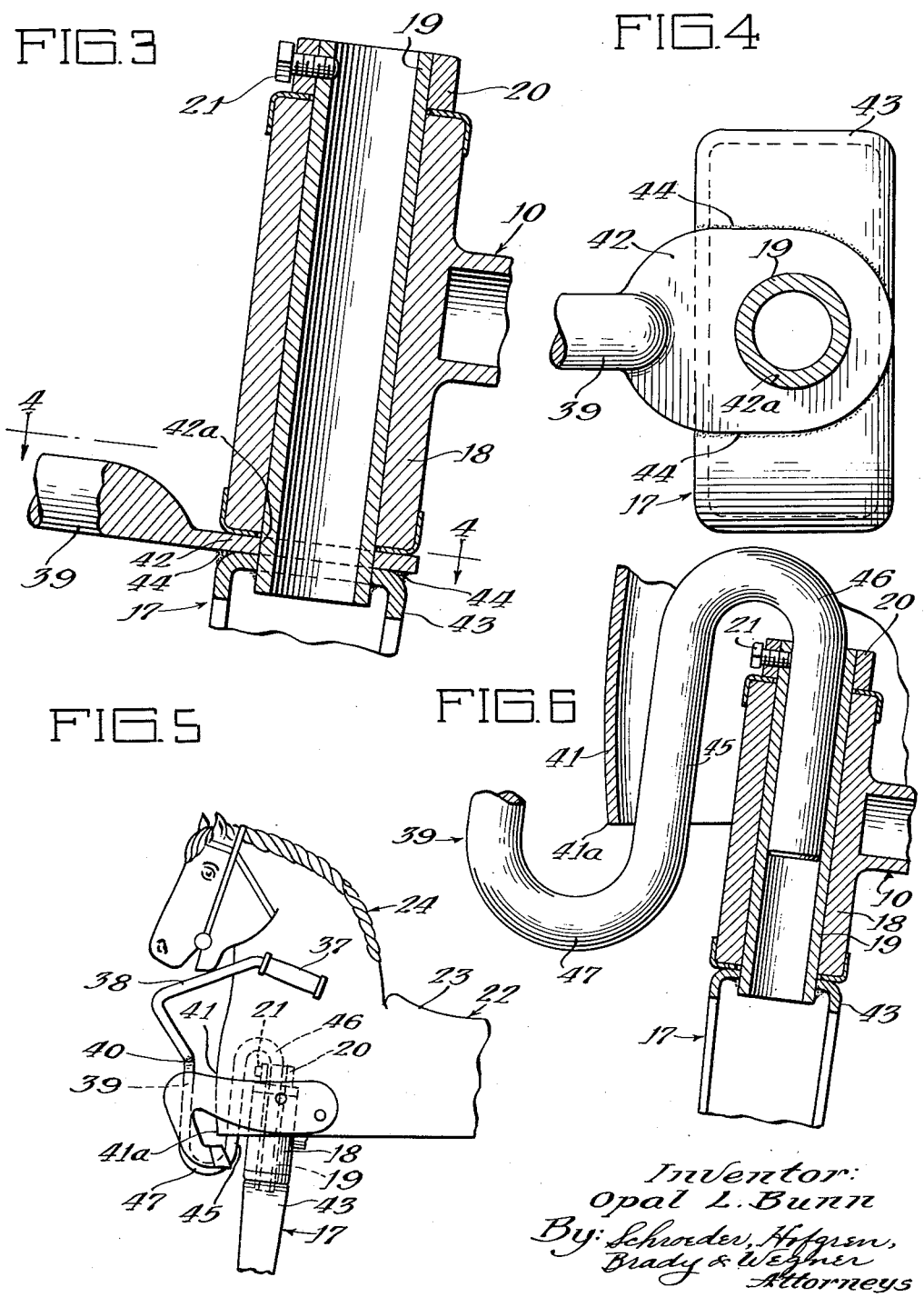

United States Patent Office
3,051,501
Patented Aug. 28, 1962

3,051,501
STEERING APPARATUS FOR CHILD'S VEHICLE
Opal L. Bunn, Chicago, Ill., assignor to Fields-Mabie
  Corporation, a corporation of Illinois
Original application Sept. 2, 1958, Ser. No. 758,434. Divided and this application Mar. 20, 1961, Ser. No. 97,985
4 Claims. (Cl. 280—1.188)

This invention relates to a child's vehicle embodying a tricycle frame and wheels with a simulated animal body demountably attached to the frame and more particularly to improved steering apparatus for such a vehicle.

This application is a division of my copending application, Serial No. 758,434, filed September 2, 1958, now abandoned.

There have been several past attempts to market a child's vehicle with an animal body form as a seat, however, there seems to have been little commercial success. A vehicle of this nature is known to be very appealing to children, as it combines the features of a tricycle and, for example, a hobby horse.

It is believed that one of the reasons for lack of commercial success in this field is that these structures heretofore had an unsatisfactory steering mechanism. In marking a workable vehicle one of the primary problems encountered has been the structure and arrangement of the steering apparatus. Some of the prior attempts to solve this steering problem have called for swivelling of the animal head with steering handles that protrude from the head. Such a structure is complex and entails excessive costs of manufacture and also is susceptible to damage by rough handling.

Another known steering arrangement provides for a hole in the upper front portion of the body form with the handle bar support extending through the hole. As many of these vehicles provide for a rocking motion of the animal body when the vehicle is moving, this type of steering arrangement is also unsatisfactory, as there is great danger of the riding child pinching his fingers between the hole edges and the handle bar support.

The present invention obviates the problems of pinched fingers and yet provides a structure that is durable and economical to manufacture. The steering structure of the present invention also steers the vehicle basically in the same way that a tricycle is steered and should not cause a child difficulty in controlling the vehicle.

A standard tricycle frame and wheels are utilized with a demountable animal body form attached as a seat. There are no holes in the body within reach of the child riding the vehicle, so the danger of pinched fingers is minimized. This has been accomplished generally by extending the handle bar support outwardly from the steering fork then upwardly in front of the body connecting with the handle bars which extend rearwardly on each side of the animal form head. In steering the vehicle, the handle bar support travels arcuately in front of the body as will be disclosed herein.

It is an object of this invention to provide a steering mechanism for a child's vehicle that is inexpensive, durable and safe for the riding child, minimizing the danger of pinched fingers.

Another object of this invention is to provide a child's vehicle with an attached animal body form having a steering apparatus that does not require an opening in the upper portion of the body form.

A further object of this invention is to provide a child's vehicle made of a standard tricycle and attached animal body form requiring a minimum of change in the tricycle construction while retaining the basic relationship between pedals, steering handles and seat.

Other objects and advantages may be evident from the following description and drawings, in which:

FIGURE 3 is a fragmentary enlarged vertical sectional view of the upper portion of the steering fork, mounting and handle bar support connection shown in FIG. 1;

FIGURE 4 is a generally horizontal sectional view taken substantially along line 4—4 of FIG. 3;

FIGURE 5 is a fragmentary side elevational view illustrating a second embodiment of steering apparatus of the present invention and;

FIGURE 6 is an enlarged fragmentary vertical sectional view of the steering fork, mounting and handle bar support connection shown in FIG. 5.

Figure 1:
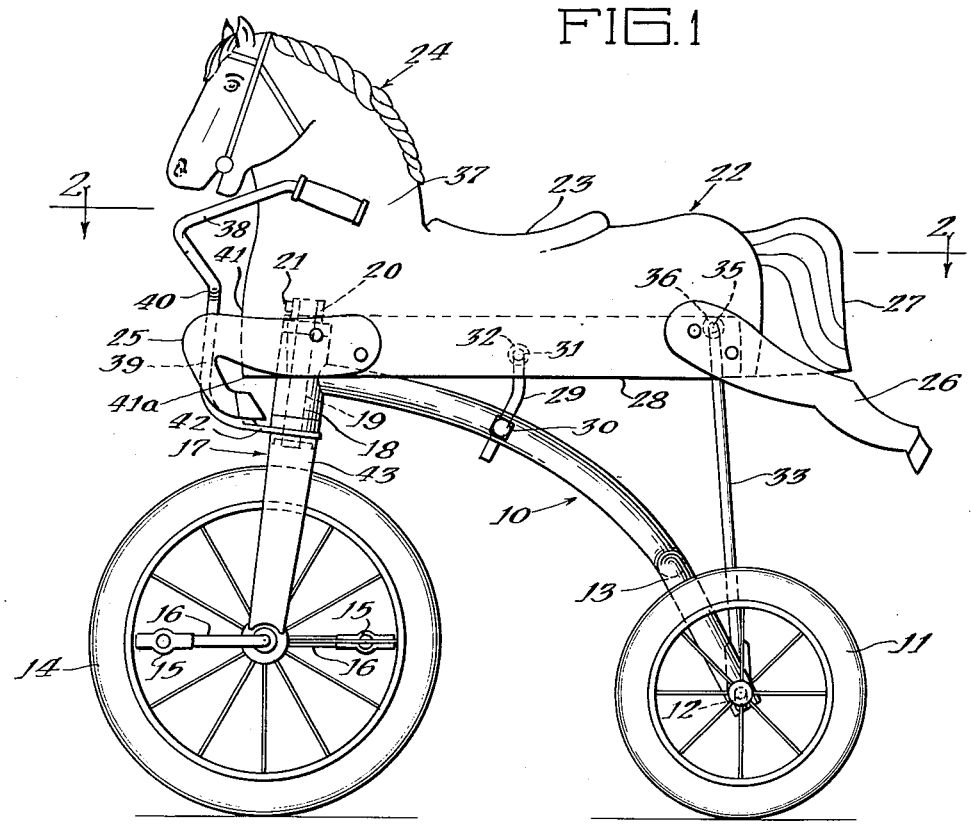
FIGURE 1 is a side elevational view of a child's vehicle embodying one form of the invention and with some hidden parts shown in dotted outline.
Figure 2:
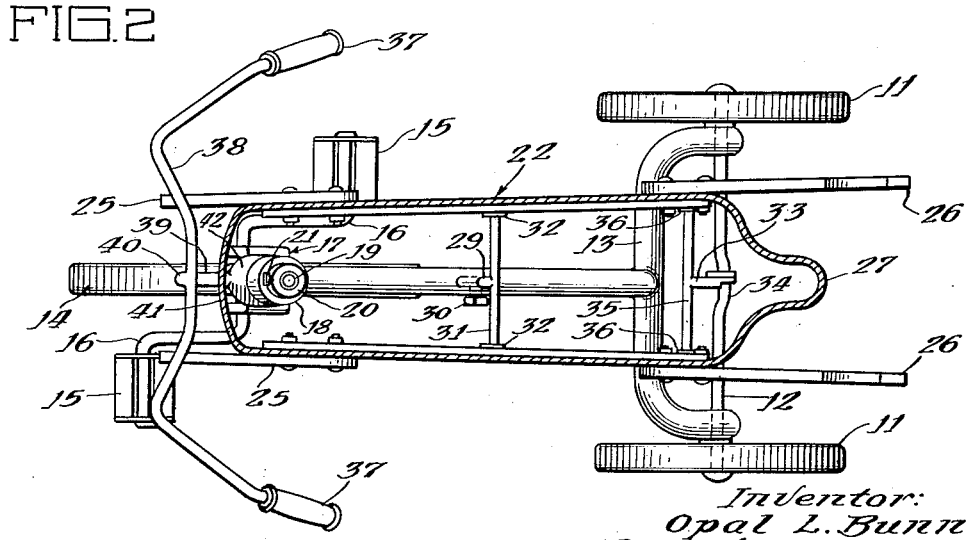
FIGURE 2 is a horizontal sectional view of the same vehicle taken substantially along line 2—2 in FIG. 1.

Referring now to the drawings, and to FIGURES 1 and 2 particularly, it will be noted that the basic structure for providing locomotion includes a standard tricycle frame 10 having two rear wheels 11 on a rear axle 12. The axle is rotatably secured to the frame through bifurcated portion 13 of the frame. The front wheel assembly has a wheel 14 with pedals 15 for supplying turning force to wheel 14 through cranks 16, the front wheel supporting the frame through bifurcated steering fork 17 which is rotatably secured in swivel mount 18, the upper portion of the fork 17 being a shaft 19 journaled in swivel mount 18 and secured therein by a retainer 20 which is fastened to the top of shaft 19 by a set screw 21 (FIG. 3).

A simulated animal body form of plastic, fiber or like material, designated generally as 22, has a seat 23 in the form of a saddle, a simulated head and neck portion 24, generally located over the steering fork 17, front legs 25, rear legs 26 and a tail 27. The body form is downwardly open and its bottom edge 28 is maintained at such a height as to be clear of the tricycle wheels 11 and 12.

The body form 22 is pivotally supported on the tricycle frame 10 by means of an angularly bent supporting rod 29 which is adjustably secured by set screw 30 and is fastened to horizontal bearing rod 31. Bearing rod 31 is journaled in bearings 32 which are secured to either side of the body form 22. A rear connecting rod 33 is supported by the rear axle 12 which may have a crank portion 34 for imparting a rocking motion to the body 22 when the vehicle is in motion. Rod 33 is connected at its upper end to a rear horizontal bearing rod 35 which is journaled in bearings 36.

Steering of the vehicle is accomplished by a turning of handles 37, which are a part of handle bar 38, which is in turn connected to handle bar support 39 at point 40 in front of the body form. Support 39 is spaced from the front surface 41 of the body, permitting the support to swing in an arc in front of the body form. Handle bar support 39 extends downwardly in front of the body and is curved rearwardly under the front edge 41a of the body form, as best seen in FIGURE 1. Note that the handle bar support 39 is fastened to steering fork 17 below swivel mount 18, the vertical spacing of the support from front edge 41a of the body permitting rocking action of body form 22 without limiting vertical travel of front edge 41a.

Referring now to FIGURES 3 and 4, the connection of handle bar support 39 to the steering fork 17 is illustrated. The lower end of support 39 is formed into a flat portion 42 having a hole 42a through which shaft 19 passes. In manufacture, the flat portion 42 is slipped over shaft 19 and is secured over the juncture of shaft 19 and the bifurcated portion 43 of steering fork 17 by welding material 44. It should be understood that means other than welding may be utilized to secure the handle bar support to the steering fork. After connection of the flat portion 42 to the steering fork 17, shaft 19 is inserted into swivel mount 18 and retainer 20 is secured by set screw 21 to pivotally hold the shaft in the swivel mount.

As seen in FIGURES 1 and 2, connection of the handle bar support to the steering fork below the swivel mount allows the handle bar support to extend forwardly from the steering fork and still maintain the spaced relationship from front edge 41a. Such a steering apparatus requires no holes in the body form for the handle bar support, minimizing the danger of pinched fingers for the riding child. As the support 39 swings in an arc about shaft 19, the front legs 25 may be utilized as stops to limit arcuate travel of the support.

If desired, the handle bar support may be secured to the front wheel fork without welding. FIGURES 5 and 6 show this embodiment of the invention. The handle bar support 39 is curved at 47 under the front edge 41a of the body form 22 so that a portion 45 of the handle bar support extends upwardly into the body form cavity between the swivel mount 18 and the front part of the body form. The support has a further portion 46 which curves in order to extend downwardly into the hollow shaft 19 of the steering fork. The support is secured to the shaft 19 of the steering fork 17 by a set screw 21, which holds retainer 20. The curved portion 47 of the handle bar support is located sufficiently low to allow vertical travel of front edge 41a of body form 22 when the body form is in rocking motion. The space between the front surface 41 of the body form and the swivel mount 18 on the tricycle frame is at a minimum directly in front of the mount as illustrated in FIGURE 6. When the steering handles are turned, portion 45 of the support will swing in an arc about the centerline of shaft 19 and will not come closer to the body form than illustrated. In this embodiment, portions of the handle bar support 39 will describe an arc both inside and outside the front of the body form and will not interfere therewith when properly positioned as illustrated.

Variations from the embodiments described will be obvious to those skilled in the art. The foregoing detailed description has been illustrative only and no unnecessary limitations should be understod therefrom.

I claim:

1. A child's vehicle, comprising: a tricycle frame and wheels of usual structure having a front wheel steering fork pivotally secured in said frame, said pivotal connection including means disposed within the connection for receiving a handle bar support; a simulated animal body form secured to said frame, the head and forward portion of said body form extending over and forwardly of said steering fork with a portion of the body extending over and about the upper portion of said fork and frame enclosing the same; a handle bar with a steering handle extending rearwardly on either side of the front portion of said body form in a position to enable a child astraddle the body form to steer the vehicle by grasping said handles; and a support secured to said handle bar, extending downwardly in front of the body form, rearwardly therefrom toward the steering fork below the animal body and then upwardly and into said connecting means to form an operable connection to the front wheel steering fork, said support being spaced forwardly of the forward portion of said body to swing substantially in an arc in front of the body form.

2. A child's vehicle, comprising: a tricycle frame and wheels of usual structure having a front wheel steering fork pivotally secured in the forward portion of said frame by a swivel mount; a simulated, one-piece animal body form downwardly open and removably secured to and extending about said frame, said body form having a head extending upwardly over the steering fork with the body extending about the upper portion of the steering fork enclosing the same; a handle bar with a steering handle extending rearwardly on either side of the front portion of said body form in such a manner as to enable a rider to steer the vehicle by grasping of said handles; a support secured to said handle bar extending downwardly in front of the body form, passing under the front edge of said downwardly open body and then upwardly into said body form to a connection with the steering fork above the swivel mount whereby the vehicle may be steered.

3. The device of claim 2 wherein said animal body has legs extending forwardly of said steering fork which limit the amount of arcuate travel of said support.

4. A child's vehicle, comprising: a tricycle frame and wheels of usual structure having a front wheel steering fork pivotally secured in the forward portion of said frame by a swivel mount, said steering fork having a hollow shaft within said swivel mount; a simulated, one-piece animal body form downwardly open and removably secured to and extending about said frame, said body form having a head extending upwardly over the steering fork with the body extending about the upper portion of the steering fork enclosing the same; a handle bar with a steering handle extending rearwardly on either side of the front portion of said body form in such a manner as to enable a rider to steer the vehicle by grasping of said handles; a support secured to said handle bar, extending downwardly in front of the body form, passing under the front edge of said downwardly open body and then upwardly into said body form into a telescoping connection with the hollow shaft within the swivel amount whereby the vehicle may be steered.

References Cited in the file of this patent

UNITED STATES PATENTS

| 665,555 | Warffuel | Jan. 8, 1901 |
| 1,932,251 | Nauts | Oct. 24, 1933 |
| 2,225,560 | Hartman | Dec. 17, 1940 |
| 2,796,265 | Fields et al. | June 18, 1957 |